United States Patent [19]

Hofmann et al.

[11] 3,934,903

[45] Jan. 27, 1976

[54] FUEL INJECTION NOZZLE ARRANGEMENT

[75] Inventors: Karl Hofmann, Aldingen; Walter Mladek, Stuttgart, both of Germany

[73] Assignee: Robert Bosch G.m.b.H., Stuttgart, Germany

[22] Filed: Jan. 31, 1974

[21] Appl. No.: 438,417

[30] Foreign Application Priority Data

Feb. 20, 1973 Germany ........................... 2308261

[52] U.S. Cl. ................ 285/156; 239/533; 285/189; 285/239; 285/321; 285/384

[51] Int. Cl.² ........................................... F16L 41/00

[58] Field of Search ............ 285/321, 188, 305, 81, 285/156, 237, 353, 384, 189, 239, 242, 150, 155, 287; 239/533

[56] References Cited

UNITED STATES PATENTS

| | | | |
|---|---|---|---|
| 1,908,821 | 5/1933 | Cornell, Jr. | 285/156 X |
| 2,112,290 | 3/1938 | Holland | 285/239 X |
| 3,245,701 | 4/1966 | Leopold, Jr. et al. | 285/239 X |
| 3,262,721 | 7/1966 | Knight | 285/242 X |
| 3,544,008 | 12/1970 | Reiners et al. | 239/533 X |
| 3,653,692 | 4/1972 | Henson | 285/242 |
| 3,680,782 | 8/1972 | Monpetit et al. | 239/533 X |
| 3,731,954 | 5/1973 | Haglund | 285/287 X |

FOREIGN PATENTS OR APPLICATIONS

| | | | |
|---|---|---|---|
| 1,098,634 | 3/1955 | France | 285/156 |

*Primary Examiner*—Werner H. Schroeder
*Assistant Examiner*—Moshe I. Cohen
*Attorney, Agent, or Firm*—Edwin E. Greigg

[57] ABSTRACT

A fuel injection nozzle arrangement for an internal combustion engine includes a nozzle holder, a hose which serves as a fuel supply conduit and a tubular socket. The tubular socket is preferably fixedly connected to the nozzle holder. A connection means is provided between the nozzle holder and the hose. The connection means includes an affixable hose nipple. A sealing means, preferably an O-ring, is positioned between a surface of the hose nipple and an opposing surface, which is preferably a surface of the tubular socket. At least one hose coupling member is associated with the affixable hose nipple. Two coupling members are preferably associated with the hose nipple.

11 Claims, 2 Drawing Figures

FUEL INJECTION NOZZLE ARRANGEMENT

BACKGROUND OF THE INVENTION

This invention relates to a fuel injection nozzle arrangement for internal combustion engines having a fuel connection between a nozzle holder and a hose serving as fuel conduit.

The present invention relates, more particularly, to a fuel injection nozzle arrangement having a fuel connection between the nozzle holder and a hose serving as fuel conduit, the fuel connection being a tube socket. The tube socket is preferably disposed on the nozzle holder.

In fuel injection nozzle arrangements of this type, on the one hand, the connection between the fuel injection nozzle holder and the hose should be easily detachable, for example, for changing the injection nozzle to one of different size and, on the other hand, such a connection must be easy to manufacture, because it desirably should be producible in large quantities.

SUMMARY OF THE INVENTION

An object of the present invention is to provide a fuel injection nozzle arrangement which includes an easily detachable fuel connection between the nozzle holder and a hose.

An additional object of the present invention is to provide a fuel injection nozzle arrangement having a fuel connection, which is readily manufacturable in large quantities, between the nozzle holder and a hose.

The foregoing objects, as well as others, are achieved in accordance with the present invention by providing a fuel injection nozzle arrangement for internal combustion engines which includes a nozzle holder, a hose serving as a fuel supply conduit and a tubular socket. A connection means, which includes an affixable hose nipple, is positioned between the nozzle holder and the hose. A sealing means is positioned between a surface of the hose nipple and an opposing surface. At least one hose coupling member is associated with the affixable hose nipple.

The tubular socket is preferably fixed to the nozzle holder and the opposing surface is formed on the tubular socket.

It is a salient feature of the present invention that an affixable hose nipple serves as a fuel connection, the hose nipple having a seal mounted opposite a surface of a connecting fixture, in the form of a plug, preferably developed as a tubular socket, and having at least one hose coupling member. Instead of the preferred embodiment, in which the tube socket is integral with or fixedly connected to the nozzle holder, by soldering or the like, the tubular socket may also be fastened to the hose nipple, and inserted into a bore in the nozzle holder.

According to one embodiment of the invention, an O-ring carried in a ring nut of the tubular socket serves as the seal.

According to a preferred embodiment of the present invention, two hose coupling members are provided on the hose nipple, the hose coupling members being arranged as respective short arms of a T-configuration, with respect to a portion of the hose nipple which mates with the tubular socket. In high pressure fuel injection nozzles the drain channels of the individual nozzles are connected together by means of T-pieces in the drain channel. Individual lines from each of the nozzles to the fuel tank are consequently unnecessary. By means of this novel embodiment, i.e. by installing the hose coupling members directly on the hose nipple, thereby providing the T-configuration, the conduits may be desirably shortened, which leads especially to the advantage of fewer free-hanging conduits, along with fewer places for possible leaks exist.

In an additional important embodiment of the present invention, a recess incorporating the tubular socket is disposed on the nozzle holder. This recess is sufficiently large so that when the nozzle is attached to an internal combustion engine by means of a hollow screw or the like, the hollow screw is unobstructedly displaceable past the tubular socket over the recess from the side of the nozzle facing away from the internal combustion engine, which presents a considerable technical advantage in mounting.

According to a further development of this embodiment, the recess has two surfaces substantially perpendicular to one another and oblique to the longitudinal axis of the nozzle. The tubular socket protrudes from that one of the surfaces facing the internal combustion engine so that the affixed hose nipple abuts the other surface with its longitudinal side at least along its portion turned toward the tubular socket. The hose nipple is secured against displacement by a device disposed on the nozzle holder. A resilient washer positioned on the nozzle holder in the vicinity of the recess serves advantageously as the device for keeping the hose nipple in place.

A substantial advantage in the novel embodiments results from the fact that the hose nipple may be produced of a synthetic material.

DESCRIPTION OF THE PREFERRED EMBODIMENTS

Figure 1:
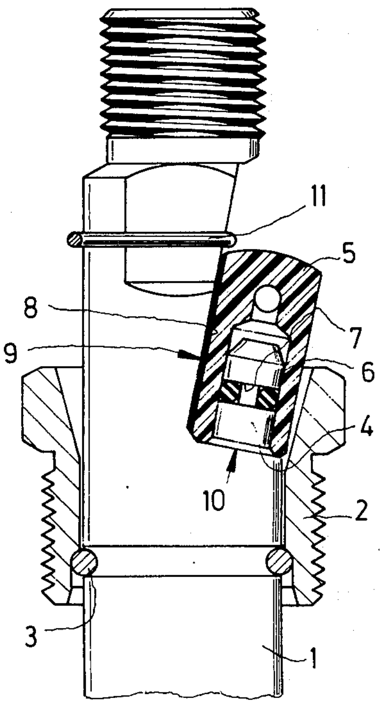
FIG. 1 is a partial longitudinal view of an illustrative embodiment of a nozzle arrangement according to the present invention, a nozzle holder with its associated tensioning ring and hose nipple being shown in cross section.
Figure 2:
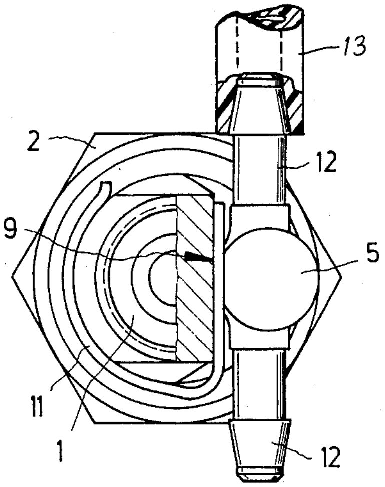
FIG. 2 is a top view partially in section of the injection nozzle arrangement of FIG. 1 from the side facing away from an internal combustion engine.

An illustrative embodiment of a fuel injection nozzle arrangement according to the present invention, as shown in FIGS. 1 and 2, includes a nozzle holder 1, partially shown. The nozzle holder 1 is fixed to an internal combustion engine (not shown) by a tensioning screw 2 and a resilient washer 3 in a conventional manner.

A conduit leads to the interior (not visible) of the nozzle holder 1, the interior including a tubular socket 4 which serves as a connecting fixture, in the form of a plug, onto which there is mounted a hose nipple 5. Between the tubular socket 4 and the hose nipple 5 there is provided an O-ring 6 for the purpose of sealing. The O-ring 6 is carried in a ring nut 7 of the hose socket 4.

The nozzle holder 1 has a recess 8 in its portion incorporating the tubular socket 4, the recess having surfaces 9 and 10 disposed perpendicularly to one another. The tubular socket 4 protrudes from the surface 10, and the hose nipple 5 abuts the surface 9 with its longitudinal side when it is mounted on the tubular socket 4. In order to prevent the sliding off of the hose nipple 5 from the tubular socket 4, a resilient washer 11 is provided on a tapered section of the nozzle holder 1. Because the surface 9 is oblique to the nozzle axis, the resilient washer 11, abutting the surface 9, presses in the direction of the tubular socket 4, holding the hose nipple 5 onto the surface 10.

As visible in FIG. 2, the hose nipple 5 has two hose coupling members 12 onto which are affixed hoses 13 constituting the drain channels leading either to a fuel tank or to another fuel injection nozzle. Only one of the hoses 13 is shown for clarity.

The recess 8 and the tubular socket 4 are developed in such a manner that upon removal of the hose nipple 5, the tightening screw 2 may be drawn past the recess 8 without obstructing or touching the tubular socket 4.

As illustrated, the tubular socket 4 is integral with the nozzle holder 1. It is to be understood, however, that tubular socket 4 and the nozzle holder 1 could be made of separate parts. The tubular socket could be soldered to the nozzle holder 1. The tubular socket 4 could be fastened to the hose nipple 5 and inserted in a bore of the nozzle holder 1.

It is to be understood that the foregoing description and accompanying drawings are given by way of example. Numerous variants and other embodiments are possible without departing from the spirit and scope of the invention, the scope being defined in the appended claims.

What is claimed is:

1. A fuel injection nozzle arrangement for internal combustion engines comprising, in combination:

a. a nozzle holder;

b. a hose serving as a fuel supply conduit;

c. a tubular socket connected to and extending outwardly from a surface of said nozzle holder and adjacent to an abutment surface of the nozzle holder;

d. a hose nipple forming connection means between said nozzle holder and said hose, said hose nipple including an affixable portion having a bore within which the tubular socket is received for mounting the hose nipple to the nozzle holder and an outer surface which is at least coextensive with said bore and is substantially parallel to the abutment surface when the hose nipple is mounted to the tubular socket, said hose nipple engaging the abutment surface when mounted to the tubular socket to provide a secure fit of the hose nipple to the nozzle holder;

e. a sealing means positioned between an internal surface of said bore and an opposing surface of said tubular socket; and f. at least one hose coupling member coupled to said affixable portion.

2. A fuel injection nozzle arrangement as defined in claim 1, wherein said tubular socket is fixed to said nozzle holder, and said sealing means is an O-ring positioned between said opposing surface of said tubular socket and said internal surface of said hose nipple.

3. A fuel injection nozzle arrangement as defined in claim 2, wherein said O-ring is carried within said hose nipple.

4. A fuel injection nozzle arrangement as defined in claim 1, wherein said sealing means comprises an O-ring carried within said hose nipple.

5. A fuel injection nozzle arrangement as defined in claim 1, wherein said at least one hose coupling member comprises two hose coupling members arranged on said hose nipple, said hose coupling members and said hose being arranged in a I-configuration.

6. A fuel injection nozzle arrangement as defined in claim 1, wherein said hose nipple is made of synthetic material.

7. A fuel injection nozzle arrangement for internal combustion engines comprising, in combination:

a. a nozzle holder including a recess;

b. a hose serving as a fuel supply conduit;

c. a tubular socket extending outwardly from a surface of said nozzle holder;

d. connection means between said nozzle holder and said hose, said connection means including an affixable hose nipple positioned over said socket;

e. a sealing means positioned between an internal surface of said hose nipple and an opposing surface of said tubular socket; and f. at least one hose coupling member coupled to said affixable hose nipple, said tubular socket being disposed within said nozzle holder recess.

8. A fuel injection nozzle arrangement as defined in claim 7, including a hollow threaded member positioned about said nozzle holder for affixing said nozzle holder to an internal combustion engine, said hollow threaded member being displaceable unobstructedly by said tubular socket and past said recess from a side of said nozzle holder which is to face away from said internal combustion engine.

9. A fuel injection nozzle arrangement as defined in claim 7, further including displacement limiting means, and wherein said recess has two surfaces extending substantially perpendicular to one another and obliquely to the longitudinal axis of said nozzle holder, said tubular socket protruding from that one of said two surfaces which is to face said internal combustion engine so that said hose nipple abuts the other one of said two surfaces with at least a portion of its longitudinal side turned towards said tubular socket, said hose nipple being fastened on said nozzle holder by said displacement limiting means.

10. A fuel injection nozzle arrangement as defined in claim 9, wherein the displacement limiting means comprises a ring member positioned about said nozzle holder so as to hold said hose nipple in said recess.

11. A fuel injection nozzle arrangement for internal combustion engines comprising, in combination:

a. a nozzle holder;

b. a hose serving as a fuel supply conduit;

c. a tubular socket extending outwardly from a surface of said nozzle holder;

d. connection means between said nozzle holder and said hose, said connection means including an affixable hose nipple positioned over said socket;

e. a sealing means positioned between an internal surface of said hose nipple and an opposing surface of said tubular socket;

f. at least one hose coupling member coupled to said affixable hose nipple; and g. a resilient member positioned between an external surface of said nozzle holder and an external surface of said hose nipple for pressing said hose nipple against a surface of said nozzle holder which radially surrounds said tubular socket.

* * * * *